United States Patent Office 3,256,803
Patented June 21, 1966

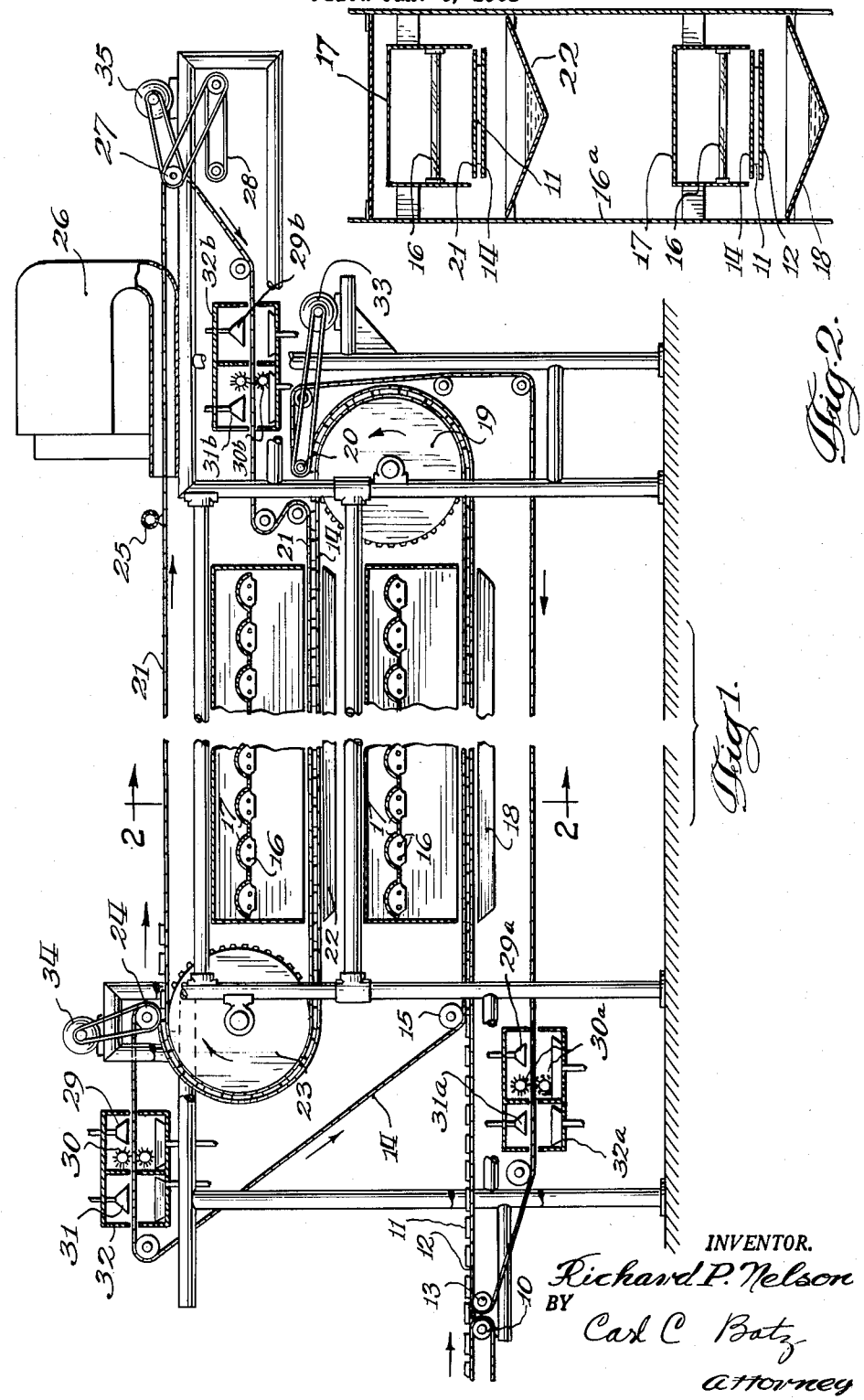

3,256,803
PRODUCTION OF PRE-COOKED SLICED BACON AND OTHER MEATS
Richard P. Nelson, La Grange, Ill., assignor to Armour and Company, Chicago, Ill., a corporation of Delaware
Filed Jan. 6, 1961, Ser. No. 81,040
13 Claims. (Cl. 99—349)

This invention relates to the production of pre-cooked sliced bacon and other meats. The invention is particularly useful in the controlled cooking and chilling and packing of meat pieces such as bacon slices, pork sausage, pork steaks, ham steaks, and the like, while preserving the pieces in their desired shape and dimensions. For the purpose of clarity, the invention will be described herein in connection with the cooking of sliced bacon.

In the prior practice of cooking bacon slices, etc., and particularly where the slices are confined during cooking, it is found that the rendered fat tends to remain on and saturate the product, blocking the radiant heat employed for cooking the product, and the final product does not have the taste of kitchen-fried bacon. Further, successive separate steps in the cooking operation increase cost and the final product lacks uniformity. I have discovered that sliced bacon, and the like, can be effectively cooked in a continuous manner between mesh conveyors in which the conveyors are reversed in direction to bring the product first under the source of radiant energy and then under another or the same source, thus exposing first one side of the slices for cooking and then the other side of the slices for cooking, the rendered fat being removed and collected immediately during the cooking steps, the final product tasting like conventional kitchen-fried bacon. In such an operation, means are provided for varying the heat impinged upon the product, for confining the product during the initial and reversed travel, and finally chilling and delivering the cooked product in the desired shingled or separated relation for packing.

A primary object, therefore, of the present invention is to provide a method and means for accomplishing the above desired results. Another object is to provide a method and means for providing controlled cooking of bacon slices whereby the rendered fat is collected first from one side and then from the other side of the bacon slices or other product, while preventing the saturation of the product with fat and retaining the product in the desired shape. A further object is to provide apparatus and method procedure whereby bacon slices, and the like, may be carried continuously in one direction under a source of radiant heat and then, upon reversal in another parallel path below a source of radiant heat, whereby the sides of the slices are successively cooked while collecting separately the rendered fat and then, after cooking, the final product is chilled and delivered in a shingled or spaced relation for final packaging. Other specific objects and advantages will appear as the specification proceeds.

The invention is shown, in an illustrative embodiment, by the accompanying drawings, in which FIG. 1 is a broken side elevational view showing apparatus embodying my invention and which may be employed in the practice of my new process; and FIG. 2, a detail sectional view, the section being taken as indicated at line 2—2 of FIG. 1.

In the illustration given and as shown more particularly in FIG. 1, a take-away or grading conveyor 10 brings bacon slices indicated by the numeral 11 from a slicing machine (not shown) to the first wire mesh conveyor 12 supported adjacent to the conveyor 10 by the roller 13 and by other rollers providing the continuous travel illustrated in detail in FIG. 1. A second wire mesh conveyor 14 is drawn downwardly toward the conveyor 12 and is supported in close relation thereto by the roller 15 so as to provide a hold-down belt over the bacon strips 11 and thereby maintaining them in the desired shape during the subsequent treating operations. The second conveyor 14 is also supported by other rollers to form the continuous travel illustrated in detail in FIG. 1. The two conveyors 12 and 14 pass under quartz lamp heaters 16 so that the radiant heat impinges upon the upper side of the slices 11 to cook them during the first stage of horizontal travel. About each pair of transverse quartz heater tubes 16 extends a reflector 17 which is preferably provided with a non-corrosive reflective surface such as a plating of gold or other suitable reflective material. As stated, the heating element 16 is preferably a quartz lamp which has the important advantage of retaining substantially no heat, so that upon the breaking of the circuit, no residual heat remains in the element. By the use of such a lamp, it is possible to control with great accuracy the temperature in each portion of the treating passage. As an example of the quartz lamp, I may refer to GE Quartz Lamp Type T–3, 1000 watt, 240 volt. I prefer to employ lamps which will apply approximately 100 kw. of heat in the 30 foot passage forming the lower path of treatment illustrated in FIG. 1. By backing such a lamp with an optically correct, high specular reflector for maximum utilization and uniform distribution of the radiant energy, it is found that effective heating is brought about instantly upon the closing of the circuit, while substantially no residual heat remains in the elements after the circuit is opened.

Supported below belts 14 and 12 as they move together under the lower group of heating tubes 16, is a trough or pan 18 for collecting the rendered fat during the first path of travel during which the bacon slices are exposed at their upper sides to radiant heat energy. The belts 12 and 14 pass together halfway around the roller 19 and then belt 12 is reversed over roller 20 in a direction opposite to that of the belt 14 and the reversed belt 14, which now serves as the carrier of the bacon slices, moves forwardly in a horizontal plane below the upper group of heater tubes 16. As the belt 14 moves forwardly under the upper group of heater tubes, a third belt 21, guided upon rollers, is brought down over the belt 14 and the bacon slices thereon to hold the slices firmly against the belt 14. The uncooked sides of the bacon slices are now exposed for cooking and the rendered fat is collected by the trough 22 which extends below the upper group of heater tubes. The two belts 14 and 21 are now brought halfway around the roller 23 and the belt 14 is reversed laterally over roller 24 as indicated in FIG. 1. The bacon slices, which have now been cooked upon both sides, are carried forwardly on the belt 21 and compressed air is discharged through the perforated pipe 25 to remove any free fat or moisture from the bacon slices. The conveyor 21 carries the bacon slices through a chiller 26 in which refrigerated air reduces the temperature of the bacon to that desired for packing. From the chiller, the belt 21 passes over a reversing roller 27 and the bacon is discharged onto a take-away belt 28 which may be driven at a slower rate of travel than that of belt 21 so as to form the slices 11 in shingled arrangement or at a faster rate of travel to space the slices on the belt 28. The slices are delivered by belt 28 to a packing section, where the slices may be vacuum packed or packed in any other desired form of package.

Any suitable cleaning apparatus may be provided for cleaning the wire mesh belts or conveyors. As indicated, the conveyor 14 may be subjected to a detergent or any washing fluid discharged from the shower head 29 and then, after being subjected to scrub brushes 30, may be subjected again to rinse water from the shower 31. The entire cleaning apparatus is indicated by the numeral 32. A similar cleaning apparatus, indicated by the numeral 32a, is provided for washing the mesh conveyor 12, the apparatus being provided with a detergent head 29a, scrub brushes 30a, and a rinse head 31a. A similar washing apparatus 32b may be provided for the third belt 21, using a detergent shower head 29b, scrub brushes 30b, and a rinse head 31b. In such cleaning operations, a cleaning solution or detergent may be discharged upon the screen conveyor and the conveyor then scrubbed by brushes, and finally the detergent solution is washed away and the screen rinsed by rinse solution from the final spray head. In such operations, it will be understood that the detergent or washing or rinsing solutions may be recycled, screened, skimmed and reused.

Any suitable means for driving the conveyors may be provided. In the illustration given, a belt-equipped motor 33 drives the roller 20 and the lower belt 12. The belt-equipped motor 34 drives the roller 24 and thereby mesh conveyor 14, and the belt-equipped motor 35 drives the roller 27 and thereby the third belt 21.

Operation

In the operation of the process and apparatus, smoked and molded bacon bellies are sliced and the slices 11 permitted to fall in spaced relation on the take-away conveyor 10 in such a manner that there is no overlapping or shingling of the individual slices. The take-away conveyor 10 discharges the slices 11 upon the wire mesh conveyor 12, which transports them under the lower horizontal row of cooking elements 16. As the wire mesh conveyor 12 bearing the bacon slices progresses in the direction toward the lower cooking section, a second wire mesh conveyor 14 is brought down into contact with the bacon slices 11 on conveyor 12. The function of the second conveyor 14 at this stage is to hold the bacon slices in place, thereby preventing distortion of the slices in the cooking operation.

The two conveyors then enter a tunnel type oven 16a, passing under the lower bank of cooking elements where the quartz lamps or tubes 16 furnish radiant heat for the cooking operation. The lamps are controlled in an on-and-off system so as to provide any desired temperature. For example, the operator may utilize only 75% of the cooking elements, or any desired number of the cooking elements, for a given period of time, thus controlling accurately the heat imported to the slices 11 as they travel through the cooking tunnel in the lower portion of the oven 16a, where the top sides of the slices are cooked and the heat-rendered fat is drained away and collected in the pan 18.

The two conveyors 12 and 14, having progressed through the length of the cooking tunnel 16a, now rotate 180° in a vertical plane so as to reverse the bacon slices and to place them upon conveyor 14 with the uncooked sides of the bacon slices now exposed to the upper bank of heating tubes 16. The conveyor 12 is now withdrawn over the drive roller 20 and a new conveyor 21 becomes the hold-down screen as the bacon slices are moved under the upper bank of heating tubes 16. The rendered fat from the product drains away and is recovered in pan 22.

The two conveyors 14 and 21 pass around the reversing roller 23 and the conveyor 14 is then withdrawn over drive roller 24, leaving the mesh conveyor 21 now as the conveyor for the slices 11.

Excess liquefied fat, etc, remaining upon the cooked slices is removed by the air blast from the pipe 25 and the cooked slices now pass through a chilling tunnel 26, where they are chilled through exposure to circulated refrigerated air. Conveyor 21 now passes around the driven roller 37 and discharges the slices upon the conveyor 28 which may be driven at a lower rate of travel than that of conveyor 21 to cause the slices to be arranged in shingled formation or driven at a faster speed to separate the slices, and the slices are then packaged under vacuum or in any other suitable means.

Any suitable means for controlling the operation of the heating elements, namely, switch means for turning the elements on or off for selected periods of time, may be employed. For example, cam shafts for opening and closing circuits in a predetermined sequence may be employed. For example, the operation may be set for automatic control so that the lamps in the lower bank are on 75% of the time during the passage of the slices through the lower leg of travel, while the lamps may be on 60% of the time in the upper bank during the passage of the bacon slices through the upper parallel leg of travel.

A specific example of the process and apparatus operation may be described as follows:

Example I 14-pound bacon belly which had been cured, smoked and molded, was sliced and the slices laid out on the take-away conveyor 10 as shown in FIG. 1, and carried through the apparatus in the manner illustrated in FIG. 1, the slices moving at the rate of 30 feet per minute. The lamps, which can apply approximately 100 kw. of heat in the 30-foot pass under the lower bank of heating elements, were controlled so that the lamps were on 75% of the time during the pass below the lower bank of heating elements. The bacon slices, upon reversal, were then subjected to heat from the upper bank of heating elements, which were on 65% of the time during the second stage of travel. The bacon slices, which have now received an internal heat of approximately 200° F., were subjected to refrigerated air to bring them down to a suitable packing temperature. The bacon, at this temperature and while still hot, was packed in vacuum cans for shipment.

While, in the apparatus described, the heating elements 16 are arranged in pairs, it will be understood that a single heating element or a number of elements may be employed with each reflector 17. Further, the arrangement of the heating elements may be varied and the location of the cooling means may also be modified. While a single source of heat may be employed, I prefer to employ the two parallel sources arranged as illustrated in FIG. 1 for successive cooking of the slices so that one side of each slice is cooked during the first pass below the lower bank of heating elements, and then the other side of the bacon slice is cooked during the second pass, so that the fat leaves instantly in each operation and does not tend to saturate the product or to form globules of fat which block radiant heat, while at the same time producing a bacon product having the taste of kitchen-fried or fresh fried bacon.

While, in the foregoing specification, I have shown a specific structure and procedure in considerable detail for the purpose of illustrating an embodiment of the invention, it will be understood that such details may be varied widely by those skilled in the art without departing from the spirit of my invention.

I claim:

1. In an apparatus for cooking meat pieces, a first mesh conveyor adapted to receive meat pieces thereon, a second mesh conveyor having portions adjacent to said first conveyor for holding said pieces flat against said first conveyor, means for driving said conveyors in a first travel position, means for inverting the positions of said conveyors whereby said second conveyor becomes the support for said meat pieces, a third conveyor having portions adjacent to said second conveyor for holding said pieces flat against said second conveyor, means for driving said conveyors in a second travel position, means for directing radiant heat upon conveyors for a portion of said first travel position so that radiant heat impinges upon one side of said meat pieces, and means for directing radiant heat upon conveyors for a portion of said second travel position so that radiant heat impinges upon the other side of said meat pieces.

2. In an apparatus for cooking meat pieces, a first mesh conveyor, a second mesh conveyor having portions adjacent to said first conveyor for holding said pieces flat against said first conveyor, means for driving said conveyors, means for inverting positions of said conveyors to cause them to travel in reversed directions in adjacent runs, means for directing radiant heat upon one side of said conveyors during the first run so that radiant heat impinges upon one side of said meat pieces, and means for directing radiant heat upon the other side of said conveyors during travel in a reversed direction in adjacent runs so that radiant heat impinges upon the other side of said meat pieces.

3. In an apparatus for cooking meat pieces, a first continuous mesh conveyor adapted to receive the meat pieces thereon, a second continuous mesh conveyor having portions adjacent said first conveyor for holding said pieces flat against said first conveyor, means for moving said conveyors in unison, means for inverting the positions so that said second conveyor receives the meat pieces thereon, and sources of radiant heat above said conveyors in their initial and inverted positions for directing radiant heat successively upon both the sides of said meat pieces.

4. The structure of claim 3 in which the sources of radiant heat are electric resistance quartz lamps.

5. In an apparatus for cooking meat pieces, a first mesh conveyor adapted to receive meat pieces thereon, a second mesh conveyor having portions adjacent said first conveyor holding said pieces flat against said first conveyor, a roller, means for passing said conveyors in unison partially about said roller to invert the positions of said conveyors, and means for maintaining a source of radiant heat above said conveyors.

6. The structure of claim 5 in which said first conveyor is directed away from said second conveyor after said second conveyor is inverted in position to serve as a support of said pieces, and in which a third mesh conveyor is brought against said inverted second conveyor, for holding said pieces flat against said second conveyor.

7. In an apparatus for treating meat pieces, first and second conveyors for holding meat pieces therebetween, means for moving said conveyors in unison in a first travel position below a first cooking source, means for moving said conveyors partially about a roller to invert the positions of said conveyors and for carrying said second conveyor in an inverted position in a second travel position below a second cooking source, a third conveyor having portions brought into contact with and traveling in unison with second said conveyor in said second travel position, and means for diverging said second and third conveyors so as to free and to discharge the said pieces from second conveyor.

8. The structure of claim 7 in which a fourth conveyor is moved at a variable controlled speed below the third conveyor for receiving the said pieces therefrom in a predetermined relation.

9. In an apparatus for treating meat slices, first and second conveyors for holding said slices therebetween, means for moving said conveyors in unison in a first travel position below a first cooking source, means for moving said conveyors partially about a roller to invert the position of said conveyors, means for separating said conveyors and for carrying said second conveyor in an inverted position in a second travel position below a second cooking source, a third conveyor having portions brought into contact with and traveling in unison with said second conveyor in a second travel position, a chilling chamber, and means for carrying said third conveyor through said chilling chamber.

10. In an apparatus for cooking sliced bacon, a first continuous mesh conveyor adapted to receive the said slices thereon in spaced-apart relation, a second continuous mesh conveyor having portions adjacent said first conveyor for holding said slices flat against said first conveyor, means for moving said conveyors in unison, roller means for inverting the position of said conveyors, a third conveyor having portions brought into contact with and travelling in unison with said second conveyor, sources of radiant heat above said conveyors directed at said conveyors so as to heat first one side of the said slices and then the other, and means for separately collecting the rendered fat from each direction of travel of said conveyors.

11. The structure of claim 10 in which the sources of radiant heat are quartz lamps with reflectors mounted above the conveyors.

12. The structure of claim 10 having cleaning means through which the conveyors pass following the discharge of said slices therefrom.

13. The structure of claim 10 in which two rollers are employed for twice inverting the positions of said second conveyor.

References Cited by the Examiner

UNITED STATES PATENTS

| | | | |
|---|---|---|---|
| 1,263,317 | 4/1918 | Garza | 107—58 |
| 1,351,018 | 8/1920 | Blando | 107—45 |
| 1,433,511 | 10/1922 | Lawrence | 107—45 |
| 1,477,842 | 12/1923 | Narobe | 107—58 |
| 2,001,345 | 5/1935 | Forty | 34—207 |
| 2,138,813 | 12/1938 | Bemis | 99—352 |
| 2,140,163 | 12/1938 | McKee | 99—107 |
| 2,152,939 | 4/1939 | Wentworth | 198—165 |
| 2,199,584 | 5/1940 | Bemis | 99—107 |
| 2,286,644 | 6/1942 | Pringle et al. | 99—349 |
| 2,442,407 | 6/1948 | Gibbons et al. | 219—34.14 |
| 2,566,966 | 9/1951 | Rockoff | 99—261 |
| 2,584,584 | 2/1952 | Hoffman et al. | 99—443 |
| 2,585,799 | 2/1952 | Lawrence | 99—261 |
| 2,682,390 | 6/1954 | Pollard | 99—355 X |
| 3,037,443 | 6/1962 | Newkirk et al. | 219—35 |

ROBERT E. PULFREY, *Primary Examiner.*

A. H. WINKELSTEIN, JEROME SCHNALL,
*Examiners.*

HYMAN LORD, W. VAN SANTEN,
*Assistant Examiners.*